(12) United States Patent
Shinkuma

(10) Patent No.: US 10,165,019 B2
(45) Date of Patent: Dec. 25, 2018

(54) SHARED EXPERIENCE INFORMATION CONSTRUCTION SYSTEM

(71) Applicant: Kyoto University, Kyoto (JP)

(72) Inventor: Ryoichi Shinkuma, Kyoto (JP)

(73) Assignee: Kyoto University, Kyoto (JP)

( * ) Notice: Subject to any disclaimer, the term of this patent is extended or adjusted under 35 U.S.C. 154(b) by 192 days.

(21) Appl. No.: 15/320,090

(22) PCT Filed: Jun. 18, 2015

(86) PCT No.: PCT/JP2015/067549
§ 371 (c)(1),
(2) Date: Dec. 19, 2016

(87) PCT Pub. No.: WO2015/194613
PCT Pub. Date: Dec. 23, 2015

(65) Prior Publication Data

US 2017/0134449 A1    May 11, 2017

(30) Foreign Application Priority Data

Jun. 19, 2014   (JP) ................................. 2014-125919

(51) Int. Cl.
*H04L 29/08* (2006.01)
*H04L 29/06* (2006.01)
(Continued)

(52) U.S. Cl.
CPC .......... *H04L 65/4007* (2013.01); *G06F 13/00* (2013.01); *G06Q 50/10* (2013.01); *H04L 67/18* (2013.01)

(58) Field of Classification Search
CPC ..... H04L 65/4007; H04L 67/18; G06F 13/00; G06Q 50/10
(Continued)

(56) References Cited

U.S. PATENT DOCUMENTS

| 2014/0229485 | A1 | 8/2014 | Icho et al. |
| 2014/0365432 | A1* | 12/2014 | Jain .................. G06F 17/30194 707/610 |
| 2018/0101545 | A1* | 4/2018 | Jain .................. G06F 17/30194 |

FOREIGN PATENT DOCUMENTS

| JP | 2004234599 A | 8/2004 | |
| WO | WO-2008070502 A2 * | 6/2008 | ....... G06F 17/30017 |
| WO | 2014006903 A1 | 1/2014 | |

OTHER PUBLICATIONS

International Search Report for PCT/JP2015/067549 dated Sep. 8, 2015.

(Continued)

*Primary Examiner* — Frantz Coby
(74) *Attorney, Agent, or Firm* — Millen, White, Zelano & Branigan, P.C.; William Nixon

(57) ABSTRACT

In an information terminal processing device of a first user, after selection of a content on a prescribed experience by the first user, content identification information is output to an information terminal device of a second user B, and various information thereof is transmitted to a server device. In an information terminal device of a second user B, after the content identification information is input, a unique key corresponding to the content identification information is generated. Information on the input date and time and/or the input location of the content identification information is transmitted to the server device. In the server device, after collating unique keys, the input date and time and/or the input location of the content identification information are defined as a shared date and time and/or a shared location of the content, and the shared experience information is constructed to make a database thereof.

15 Claims, 14 Drawing Sheets

(51) Int. Cl.
*G06F 13/00* (2006.01)
*G06Q 50/10* (2012.01)

(58) Field of Classification Search
USPC .............................. 709/201, 202, 203, 204
See application file for complete search history.

(56) References Cited

OTHER PUBLICATIONS

English Abstract of JP2004234599, Publication Date: Aug. 19, 2004.

* cited by examiner

SHARED EXPERIENCE INFORMATION CONSTRUCTION SYSTEM

TECHNICAL FIELD

The present invention relates to a shared experience information construction system for constructing shared experience information showing that a content relating to a prescribed experience is shared amount users.

TECHNICAL BACKGROUND

In recent years, with the development and popularization of the Internet and communication devices, a variety of services have been provided. Among them, a number of systems for sharing information on contents of images or the like have been proposed.

For example, Patent Document 1 discloses an image sharing system. In the system, a plurality of portable terminals are connected in communicable manner. A photographing portable terminal takes an image, make image data, generates index data from the image data, and transmits the index data to another portable terminal. The another portable terminal generates shared image specifying information that specifies image data to receive from the received index data, and replies to the photographed portable terminal. The photographed portable terminal transmits the image data specified by the shared image specifying information to the another portable terminal.

Further, Patent Document 2 discloses an image sharing system. The image sharing system includes a camera 100 capable of converting an object image 33 into image data and displaying a QR code (registered trademark) relating to a storage destination of the image data on a display panel 8, and a mobile phone 34 configured to photograph the QR code (registered trademark), decode the QR code, and access the storage destination of the image 33 based on a record stored in a recording unit 52 of a site server 51 to acquire the data of the image 33.

Further, Patent Document 3 discloses a content sharing system. The content sharing system is a digital content sharing system 10 including a content server 21B that shares contents between the server and a content server 21A to which a mobile phone 30A is linked, and is linked to a mobile phone 30B. The content server 21B shares contents between the server and a content server 21A by receiving the corresponding contents from the content server B based on a content request when the mobile phone 30B received the content request utilizing content reference information exchanged at the time of the communication with the mobile phone A. The content server 21A publishes the shared contents on a network.

Further, Patent Document 4 discloses an information sharing system capable of transmitting a content ID from one portable terminal to another portable terminal during a communication processing between the portable terminal 20 and the portable terminal 22, and displaying the same content image on a display of each portable terminal during communication processing between the portable terminal 20 and the portable terminal 22 to display the image of the contents of the content ID to each of the display portion 26 and the display portion 36 in both portable terminals (portable terminal 20 and portable terminal 22).

PRIOR ART DOCUMENT

Patent Document

Patent Document 1: Japanese Unexamined Patent Application Publication No. 2010-86174

Patent Document 2: Japanese Unexamined Patent Application Publication No. 2008-236159

Patent Document 3: Japanese Unexamined Patent Application Publication No. 2008-158843

Patent Document 4: Japanese Unexamined Patent Application Publication No. 2004-297250

SUMMARY OF THE INVENTION

Problems to be Solved by the Invention

However, conventional sharing systems merely share the contents "themselves", such as, e.g., images, and do not share the "facts" of sharing the contents of images or the like, i.e., where, when, and/or with whom the contents of images, etc., are shared. For this reason, even if the contents of the shared images, etc., are browsed later, it was unable to specify the shared users, the shared date and time, and/or the shared location on the contents, which cannot be said that the shared experience information among users is shared in the true sense.

The present invention was made in view of the aforementioned technical background, and aims to provide a shared experience information construction system capable of sharing a shared user, a shared date and time, and/or a shared location on a content of a shared image or the like, which in turn can construct shared experience information among users.

Means for Solving the Problems

In order to attain the aforementioned objects, the present invention includes an information terminal device of a first user, an information terminal device of a second user, and a server device connected to the information terminal devices of the first user and the second user via a network. The information terminal device of the first user includes a content selection unit that selects a content on a prescribed experience by the first user, a content identification information output unit that outputs information that identifies the content selected by the content selection unit to the information terminal device of the second user, a first unique key generation unit that generates a unique key corresponding to the content selected by the content selection unit, and a first user information transmission unit that transmits information on the first user, a unique key generated by the first unique key generation unit, and information on the content to the server device via the network. The information terminal device of the second user includes a content identification information input unit that inputs the information that identifies the content output from the information terminal device of the first user, a second unique key generation unit that generates a unique key corresponding to the information that identifies the content input by the content identification information input unit, and a second user information transmission unit that transmits information on the second user, the unique key generated by the second unique key generation unit, and information on an input date and time and/or an input location of the information that identifies the content input by the content identification information input unit to the server device via the network. The server device includes a unique key collation unit that collates the unique keys transmitted from the information terminal device of the first user and the information terminal device of the second user, a shared experience information construction unit that defines the input date and the time and/or the input location of information that identifies the content transmitted from the second information terminal device as a shared date and time and/or a shared location of the content when a collation of the unique keys has been successfully performed by the unique key collation unit and correlates the information on the first user, the information of the second user, the information on the content, and the information on the shared date and time and/or the shared location with each other to construct shared experience information between the first user and the second user, and a shared experience information storage unit that stores the shared experience information between the first user and the second user constructed by the shared experience information construction unit.

It may be configured such that the first user information transmission unit of the first information terminal device transmits the information on an acquisition date and time and/or an acquisition location of the content to the server device, and the shared experience information construction unit of the server device correlates the information on the acquisition date and time and/or the acquisition location of the content and the information on the shared date and time and/or the shared location of the content with each other.

It may be configured such that the content identification information output unit of the information terminal device of the first user is an attached display and the information terminal device of the first user outputs the information that identifies the content by displaying it on the display, and the content information input unit of the information terminal device of the second user is an attached photographing camera, and the information terminal of the second user inputs the information that identifies the content displayed on the display of the information terminal device of the first user by photographing the information.

It may be configured such that the content identification information output unit of the information terminal device of the first user is an attached speaker and the information terminal device of the first user outputs the information that identifies the content by a sound of the speaker, and the content information input unit of the information terminal device of the second user is an attached microphone, and the information terminal of the second user inputs the information that identifies the content output by the sound of the speaker of the information terminal device of the first user by recording the information.

It may be configured such that the information terminal device of the first user transmits the output date and time and/or the output location that output the information that identifies the content between the information transmission unit of the first user and the information terminal device of the second user, and the unique key collation unit of the server device performs a collation whether the output date and time and/or the output location transmitted from the information terminal device of the first user and the input date and time and/or the input location transmitted from the information terminal device of the second user are within a range of a prescribed time and/or region.

It may be configured such that the server device is equipped with a shared experience information extraction unit that extracts the shared experience information stored in the shared experience information storage unit and a shared experience information output control unit that outputs the shared experience information extracted by the shared experience information extraction unit to the information terminal device of the user.

It may be configured such that the shared experience information extraction unit extracts, when a condition on the shared experience information is specified by the information terminal device of the user, the shared experience information that matches the condition from the shared experience information stored in the shared experience information storage unit.

It may be configured such that the shared experience information extraction unit extracts the shared experience information stored in the shared experience information storage unit in a state in which the information has been processed into a prescribed format.

It may be configured such that t the shared experience information output control unit makes the information terminal device of the user display the shared experience information in the order of the acquisition date and time of the content.

It may be configured such that the shared experience information output control unit makes the information terminal device of the user display the shared experience information between the user and a prescribed user.

It may be configured such that the shared experience information output control unit makes the information terminal device of the user display the shared experience information shown on a prescribed map based on the acquisition location and/or the shared location of the content included in the shared experience information.

It may be configured such that the shared experience information output control unit makes the information terminal device of the user output a shared number of times of the content at a prescribed location based on the shared date and time and/or the shared location of the content included in the shared experience information.

It may be configured such that the shared experience information output control unit makes the information terminal device of the user output a shared number of times of the content during a prescribed period of time based on the shared date and time and/or the shared location of the content included in the shared experience information.

It may be configured such that the shared experience information output control unit makes the information terminal device of the user output the shared experience information in a state in which the information relating to users is excluded.

It may be configured such that the shared experience information extraction unit groups shared experience information having a commonality based on the acquisition date and time, the acquisition location, the shared date and time and/or the shared location of the content included in the shared experience information.

Effects of the Invention

According to the present invention, it becomes possible not only to share a content such as an image or the like, but also to share shared users, shared dates and times, and/or shared locations, which in turn can construct shared experience information among users.

EMBODIMENTS FOR CARRYING OUT THE INVENTION

<First Embodiment>

Next, a first embodiment of a shared experience information construction system 1 (hereinafter referred to as "this system 1") according to the present invention will be described with reference to FIGS. 1 to 6

[Overall Structure]

Figure 1:
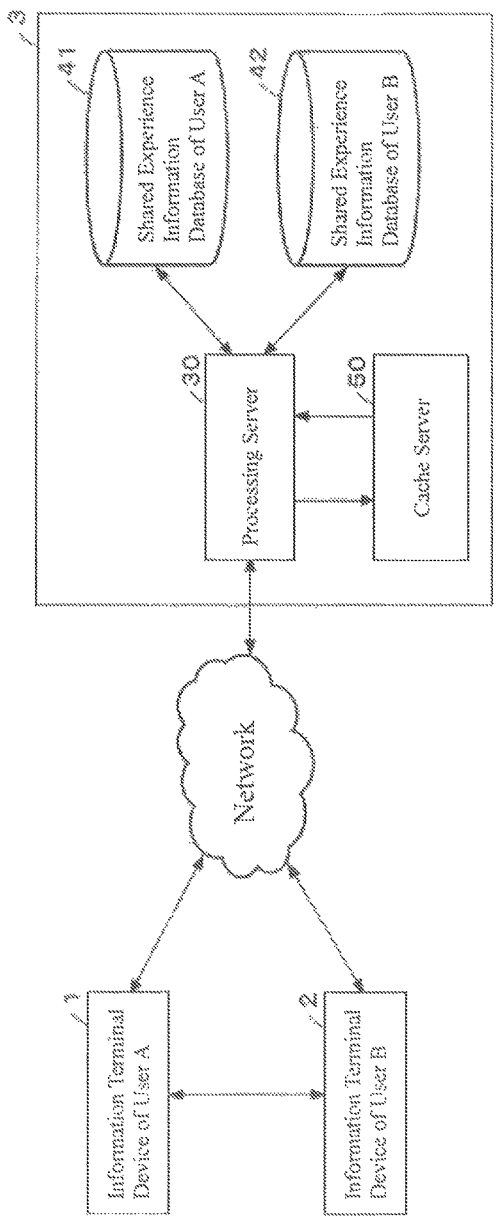
FIG. 1 is a view showing an overall configuration of this system.

FIG. 1 is a view showing an overall configuration of this system 1. As shown in FIG. 1, this system 1 is provided with an information terminal device 1 of a first user A, an information terminal device 2 of a second user B, and a server device 3 connected to the information terminal devices 1 and 2 of the first user A and the second user B via a network.

In the following explanation, for the convenience of explanation, the explanation will be made by assuming that the information terminal device 1 of the first user A is an output side of a content and the information terminal device 2 of the second user B is an input side of the content, but the output side and the input side may be reversed with each other. Further, the following explanation will be directed to the case in which there exists the information terminal device 1 of the first user A and the information terminal device 2 for the second user B, but it should be noted that in reality there exist many other information terminal devices.

[Configuration of Information Terminal Device]

The information terminal device 1 and 2 is a portable type information terminal device that can be connected to the Internet, and is exemplified by, for example, a mobile phone, a smartphone, and a tablet terminal that are equipped with a touch panel type display. Each of the user A and the user B uses the telephone function or the mail function of the information terminal device 1, 2, and makes the information terminal device display various sites on the attached display by connecting the information terminal device to the Internet. Further, the information terminal device 1, 2 has a built-in photographing camera function, and is configured to photograph persons, things, sceneries, etc., in accordance with a user operation, store the photographed content image in the device, and then display the photographed content image on the display or transmit the photographed content image to another user with the aid of its mail function or other communication functions.

Hereinafter, concrete explanations will be made separately based on the function of the information terminal device 1 of the first user A and the function of the information terminal device 2 of the second user B. Various functions of the information terminal device 1, 2 often take the form of being executed by an application program downloaded from a network to the information terminal device 1, 2.

(Information Terminal Device 1 of First User A)

Figure 2:
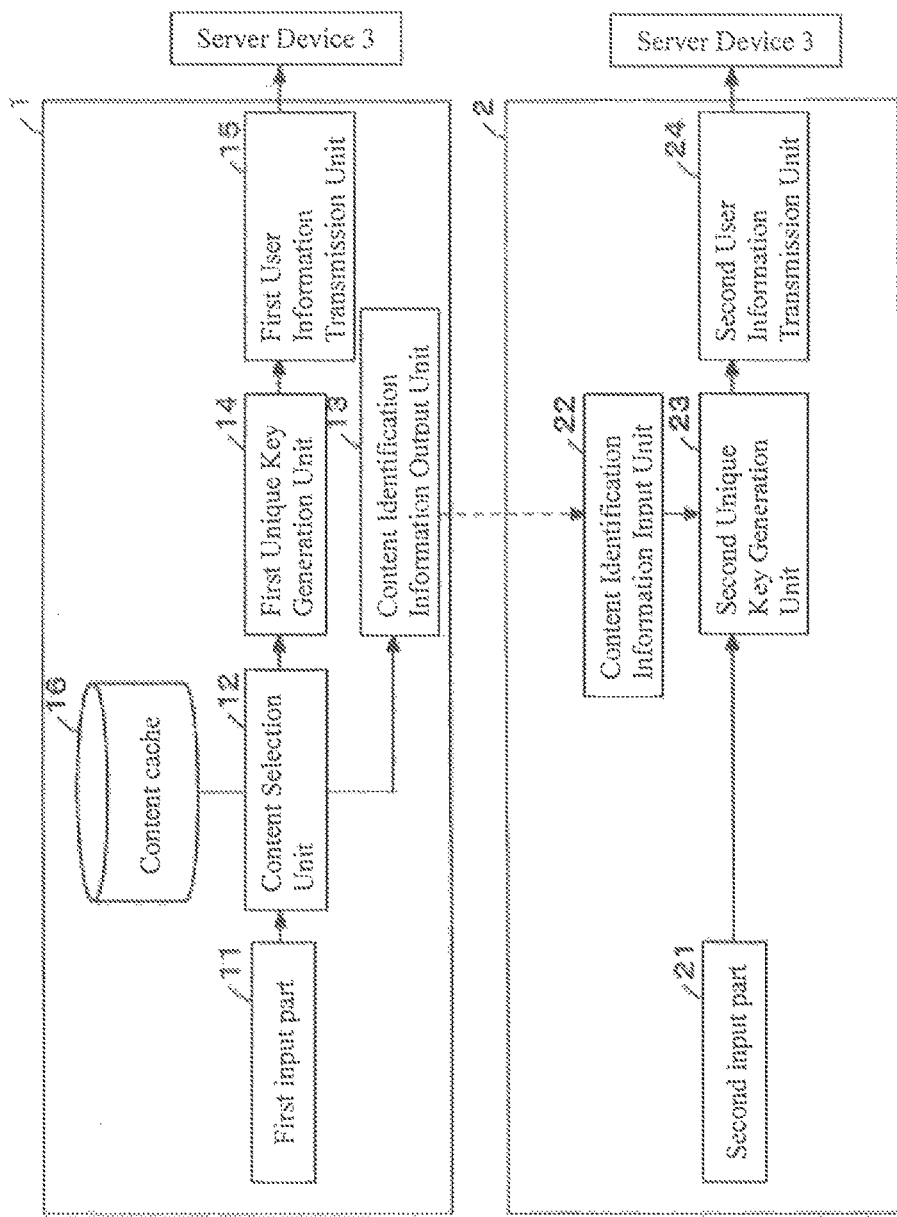
FIG. 2 is a view showing functional configurations of information terminal devices of first and second users.

As shown in FIG. 2, the information terminal device 1 of the first user A is equipped is equipped with a first input part 11 which is used at the time of selecting a content. This first input part 11 is configured by various buttons provided on the information terminal device 1, or various buttons or icons displayed on a display. The first user A can access various sites by connecting to the Internet, or can photograph persons, things, sceneries, etc., using the built-in camera function by operating the first input part with, for example, the finger. These site image, photographed image, etc., displayed on the display of the information terminal device 1 are stored in the built-in content cache 16 of the device as a content relating a prescribed experience of the first user A.

Further, as shown in FIG. 2, the information terminal device 1 of the first user A is equipped is equipped with a content selection unit 12 which is used to select a content relating to a prescribed experience. This content selection unit 12 selects a prescribed content from the content cache 16 in accordance with various operations of the first input part 11 by the first user A. For example, when the first user A operates the first input part 11 to display the past site image or photographed image on the display and instruct a selection by the first input part 11, a prescribed site image or photographed image is selected by the content selection unit 12.

As shown in FIG. 2, the information terminal device 1 of the first user A is further equipped with a content identification information output unit 13 that outputs the information for identifying the content selected by the content selection unit 12 (hereinafter referred to as "content identification information) to the information terminal device 2 of the second user B. This content identification information output unit 13 outputs the content itself of a site image, an image, etc., displayed on the display of the information terminal device 1 of the first user A as content identification information, or outputs other some unique identification information as content identification information. The content identification information output unit 13 outputs the content identification information by displaying it on the display. The content identification information output unit 13 may output the content identification information to the information terminal device 2 of the second user B by transmitting it directly or via a network.

As shown in FIG. 2, the information terminal device 1 of the first user A is further equipped with a first unique key generation unit 14 that generates a unique key corresponding to the content selected by the content selection unit 12. This first unique key generation unit 14 may define the entire or a part of image information of a site image or a photographed image which is a content as a unique key, or may define a prescribed image pattern corresponding to the content as a unique key.

Further, as shown in FIG. 2, the information terminal device 1 of the user A is provided with a first user information transmission unit 15 that transmits information on the first user A, a unique key generated by the first unique key generation unit 14, and the content selected by the content selection unit 12 to the server device 3 via a network. This first user information transmission unit 15 reads out any information capable of specifying the first user A, such as, e.g., the name of the first user A and the identification symbol, from a memory (not illustrated) in the device, and transmits the information as information on the first user A. Further, the first user information transmission unit 15 also transmits the content itself selected by the content selection unit 12 as content information, or also transmits the content pointer showing the location of the content as content information.

The information terminal device 1 of the first user A may be configured such that the acquisition date and time and/or the acquisition location of the content are obtained using a built-in timer function or a built-in navigation function of the device and the first user information transmission unit 15 transmits the information on the acquisition date and time and/or the acquisition location of the content to the server device 3.

Further, the information terminal device 1 of the first user A may be configured such that the output date and time and/or the output location in which the content identification information is output to the information terminal device 2 of the second user B using a built-in timer function or a built-in navigation function of the device and the first user information transmission unit 15 transmits the information on the output date and time and/or the output location identification information of the content to the server device 3.

(Information Terminal Device 2 of Second User B)

On the other hand, as shown in FIG. 2, the information terminal device 2 of the second user B is equipped with a second input part 21. This second input part 21 is configured by various buttons provided on the information terminal device 2, or various buttons or icons displayed on a display.

Further, as shown in FIG. 2, the information terminal device 2 of the second user B is equipped with a content identification information input unit 22 that inputs the content identification information output from the information terminal device 1 of the first user A. This content identification information input unit 22 inputs the content identification information displayed on the display of the information terminal device 1 of the first user A by directly photographing with the built-in photographing camera, or inputs the content identification information transmitted directly or via a network from the first information terminal device 1 by receiving it. Further, the content identification information input unit 22 obtains the input date and time and/or the input location of the content identification information by using a built-in timer function or a built-in navigation function of the device when the content identification information is input.

At the input stage of the content identification information by the content identification information input unit 22, the input/output of the content identification information has been completed between the information terminal device 1 of the user A and the information terminal device 2, but it is not yet in a state in which the content is shared.

Further, as shown in FIG. 2, the information terminal device 2 of the second user B is equipped with a second unique key generation unit 23 that generates a unique key corresponding to the content identification information input by the content identification information input unit 22. This second unique key generation unit 23 may define the entire or a part of image information of a site image or a photographed image which is a content as a unique key, or may define a prescribed image pattern corresponding to the content as a unique key.

Further, as shown in FIG. 2, the information terminal device 2 of the second user B is provided with a second user information transmission unit 24 that transmits information on the second user B, a unique key generated by the second unique key generation unit 23, and information on the input date and time and/or the input location of the content identification information input by the content identification information input unit 22 to the server device 3 via a network. This second user information transmission unit 24 reads out any information capable of specifying the second user B, such as, e.g., the name of the second user B and the identification symbol, from a memory (not illustrated) in the device, and transmits the information as information on the second user B.

In this embodiment, although the content is exemplified by a visual content, such as, e.g., a site image and a photographed image, the content may be an auditory content by audio (including music).

[Configuration of Server Device 3]

As shown in FIG. 1, the server device 3 is provided with a processing server 30 that performs prescribed processing between the information terminal devices 1 and 2 of users A and B, a cache server 50 that stores the processing results by the processing server 30, a shared experience information database 41 of the first user A that stores the shared experience information of the user A, and a shared experience information database 42 of the second user B that stores the shared experience information of the user B.

Figure 3:
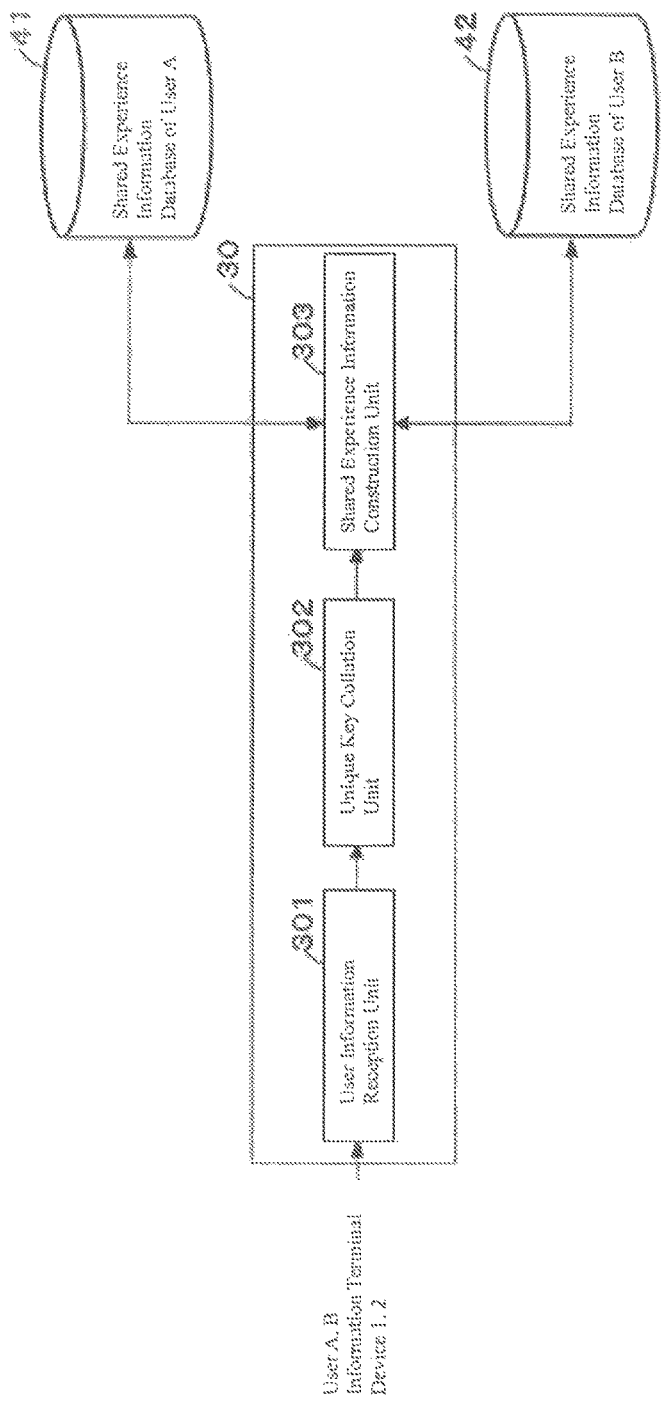
FIG. 3 is a view showing a functional configuration of a shared experience information construction of a server device.

The processing server 30 is, as shown in FIG. 3, provided with a user information reception unit 301 that receives various information on the first user A and the second user B transmitted from the information terminal devices 1 and 2 of the first user A and the second user B via the network. That is, this user information reception unit 301 receives the information, the unique key, and the content information on the first user A transmitted from the information terminal device 1 of the first user A via the network, and receives the information on the second user B, the unique key, the input date and time and/or the input location of the content identification information transmitted from the information terminal device 2 of the second user B via the network.

The processing server 30 is, as shown in FIG. 3, provided with a unique key collation unit 302 that collates unique keys of the first user A and the second user B among various information of the first user A and the second user B received by the user information reception unit 301. This unique key collation unit 302 performs an image analysis about each image information when, for example, the unique key is an entire or a part of a site image or a photographed image in which the unique key is a content, and judges that the collation has been successfully performed when each image matches with a predetermined probability. Further, when the unique key is a prescribed image pattern corresponding to the content, the unique key collation unit judges that the collation has been successfully performed when each prescribed image pattern matches. The collation method of the unique key is not limited to the aforementioned method and may be other collation methods.

When information on the output date and time and/or the output location of the content identification information is transmitted from the information terminal device 1 of the first user A, it may be configured such that the unique key collation unit 302 collates whether the output date and time and/or the output location transmitted from the information terminal device 1 of the first user A and the input date and time and/or the input location transmitted from the information terminal device 2 of the second user B are within the range of a prescribed time and/or region, and collates the unique key only when the collation is successful.

The processing server 30 is, as shown in FIG. 3, provided with a shared experience information construction unit 303 that constructs shared experience information between the first user A and the second user B about the prescribed content. This shared experience information construction unit 303 defines, when the collation of unique keys has been successfully performed by the unique key collation unit 302, the input date and time and/or the input location of the content identification information transmitted from the information terminal device 2 of the second user B as the shared date and time and/or the shared location of the content. Then, the information on the first user A, the information on the second user B, the information on the content, the shared date and time and/or the shared location of the content are correlated each other. That is, when the information terminal device 2 of the second user B inputs the content identification information output from the information terminal device 1 of the first user, the sharing has not yet established, but the sharing of the content is established when the shared experience information construction unit 303 has constructed the shared experience information.

The shared experience information construction unit 303 may be configured such that when the information on the acquisition date and time and/or the acquisition location is transmitted from the information terminal device 1 of the first user A, the information on the acquisition date and time and/or the acquisition location of the content and the information on the shared date and time and/or the shared location of the content are correlated each other.

Figure 4:
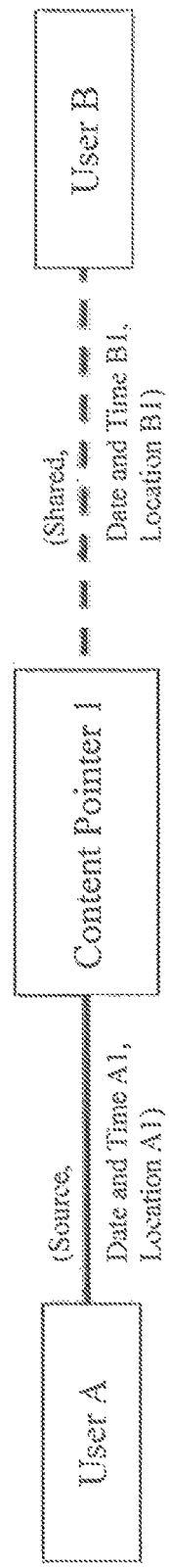
FIG. 4 is a view showing one example of a configuration of shared experience information of a server device.
Figure 5:
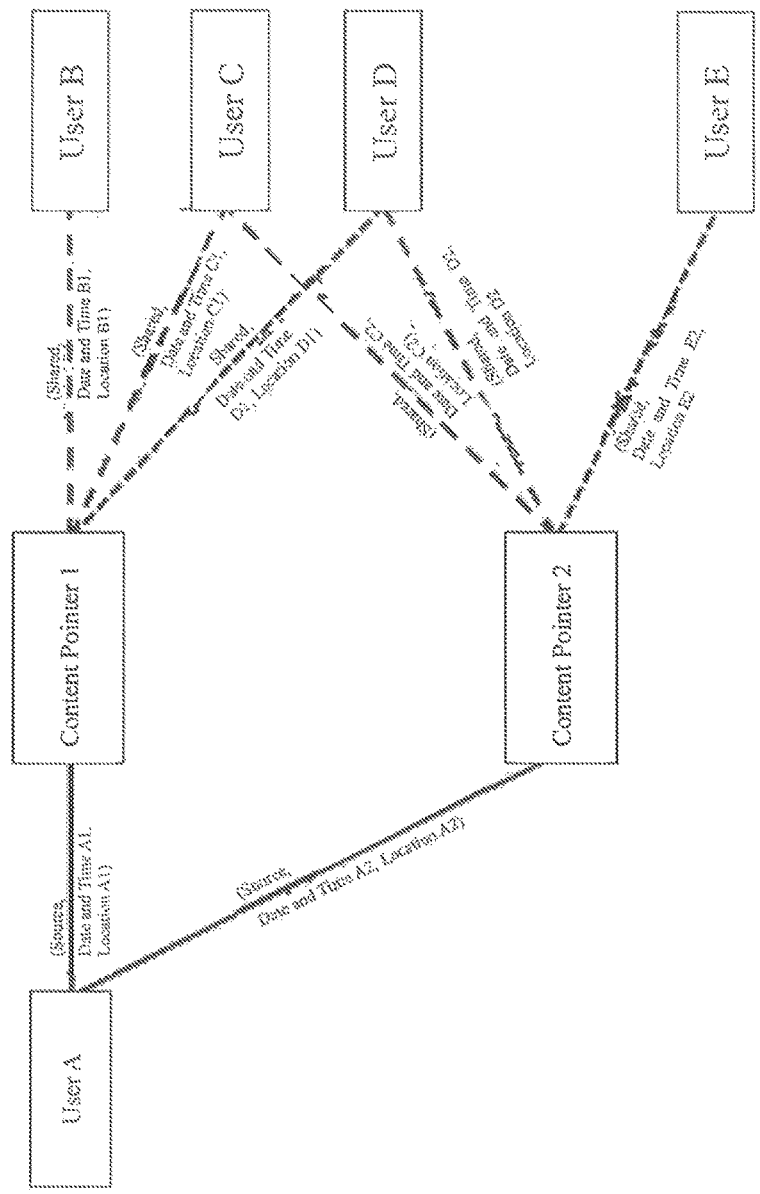
FIG. 5 is a view showing another example of a configuration of shared experience information of a server device.

FIG. 4 illustrates an example of a configuration of the shared experience information. In this example, a case in which the content information is a content pointer will be exemplified. As shown in FIG. 5, the user A has a link to the content pointer 1 which is a source itself, and information of the acquisition date and time A1 and the acquisition location A1 of the content is added to the link. Further, the content pointer 1 has a link to the second user B with whom the first user A has made "sharing", and information of the shared date and time B1 and the shared location B1 is added to the link.

FIG. 5 illustrates another example of a configuration of a shared experience information. As shown in FIG. 5, the shared experience information on the content pointer 1 and the shared experience information on the content pointer 2 are integrated. The second user B has a common link (the shared date and time B1, the shared location B1) only from the content pointer 1. The other user C has a common link (the shared date and time C1, the shared location C1) from the content pointer 1, and a common link (the shared date and time C2, the shared location C2) from the content pointer 2. Further, the other user D has a common link (the shared date and time D1, the shared location D1) from the content pointer 1, and a common link (the shared date and time D2, the shared location D2) from the content pointer 2. Further, the second user E has a common link (the shared date and time E2, the shared location E2) only from the content pointer 2.

The aforementioned shared experience information databases 41 and 42 store shared experience information of the first user A and the second user B constructed by the shared experience information construction unit 303 of the processing server 30, respectively. In this embodiment, the shared experience information databases 41 and 42 are separated for each of the first user A and the second user B, but may be a single shared experience information database.

[Operation of Shared Experience Information Construction of This System 1]

Figure 6:
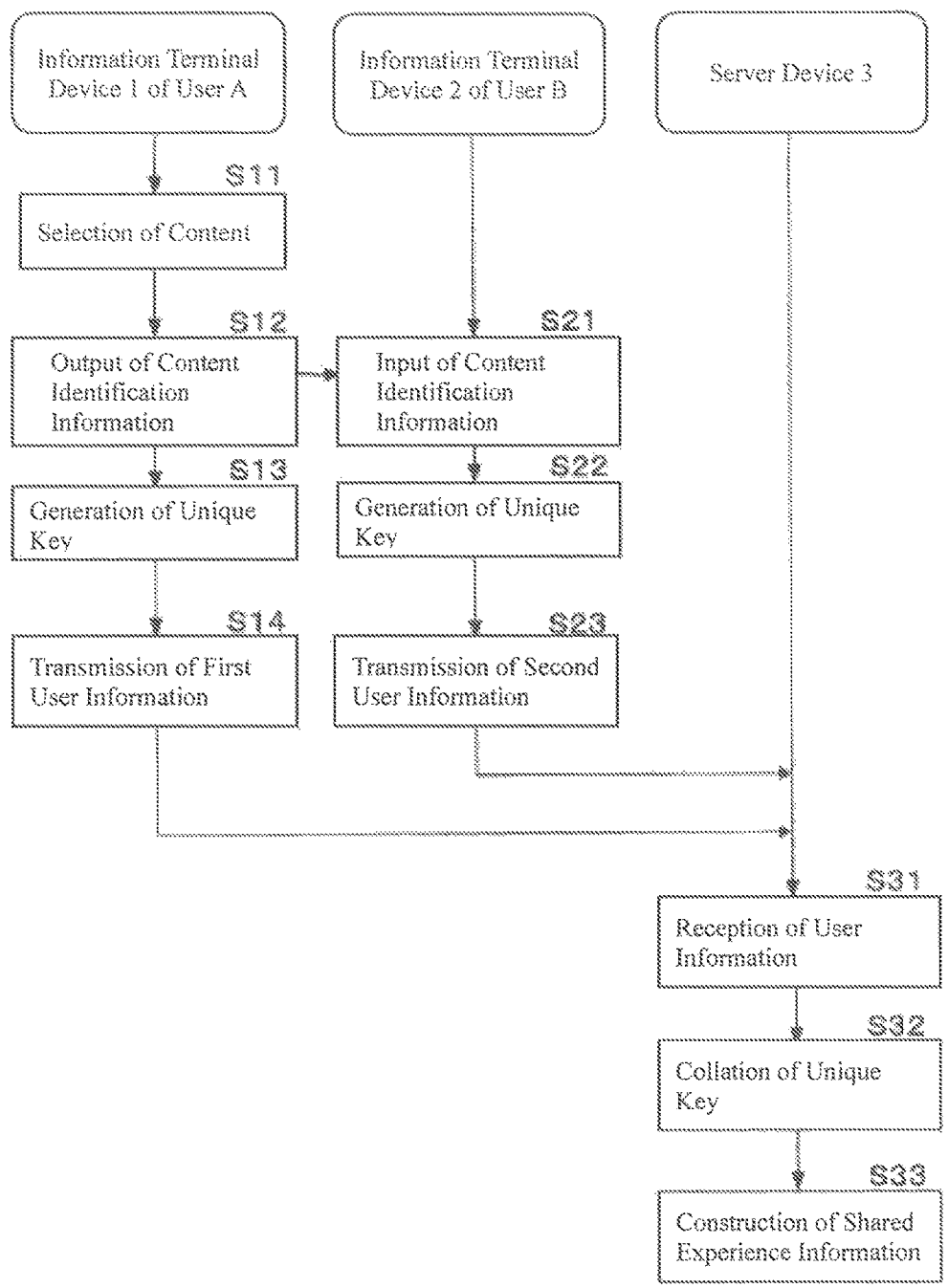
FIG. 6 is a flowchart showing an operation of constructing shared experience information of this system.

The operation of this system 1 will be explained with reference to the flowchart shown in FIG. 6. In the following explanation, "Step" is abbreviated as "S".

A first user A accesses various sites by connecting to the Internet, or photographs persons, things, sceneries, etc., using the built-in camera function by operating the first input part 11 with, for example, the finger. It is assumed that site images, photographed images, etc., displayed on the display of the information terminal device 1 of the first user A are stored in the built-in content cache 16 of the device as a content on the prescribed experience of the user.

Initially, in the information terminal device 1 of the first user A, this content selection unit 12 selects a prescribed content from the content cache 16 in accordance with various operations of the first input part 11 by the user (S11).

Then, the content identification information output unit 13 outputs the information (content identification information for identifying the content selected by the content selection unit 12 to the information terminal device 2 of the second user B (S12).

Then, the first unique key generation unit 14 generates a unique key corresponding to the content selected by the content selection unit 12 (S13).

The first user information transmission unit 15 transmits the information on the first user A, a unique key generated by the first unique key generation unit 14, and content information selected by the content selection unit 12 to the server device 3 via a network (S14).

On the other hand, in the information terminal device 2 of the second user B, the content identification information input unit 22 inputs the content identification information output from the information terminal device 1 of the first user A (S21).

Then, the second unique key generation unit 23 generates a unique key corresponding to the content identification information input by the content identification information input unit 22 (S22).

Then, the second user information transmission unit 24 transmits the information on the second user B, the unique key generated by the second unique key generation unit 23, and the information on the input date and time and/or the input location of the content identification information input by the content identification information input unit 22 to the server device 3 via a network (S23).

Thus, in the server device 3, the user information reception unit 301 receives various information of the first user A and the second user B transmitted from the information terminal devices 1 and 2 of the first user A and the second user B via the network (S31).

The unique key collation unit 302 collates unique keys among user information received by the user information reception unit 301 (S32).

Then, this shared experience information construction unit 303 defines, when the collation of each unique key is successful by the unique key collation unit 302, the input date and time and/or the input location of the content identification information transmitted from the information terminal device 2 of the second user B as the shared date and time and/or the shared location of the content. Further, the shared experience information construction unit 303 correlates the information on the first user A, the information on the second user B, the information on the content, the shared date and time and/or the shared location of the content, and further the acquisition date and time and/or the acquisition location of the content, to thereby construct as the shared experience information of the first user A and the second user B (S33).

<Second Embodiment>

Next, a second embodiment of this system 1 according to the present invention will be explained with reference to FIG. 7 to FIG. 8.

In this embodiment, the processing server 30 of the server device 3 has, in addition a function of constructing the shared experience information according to the first embodiment, a function of presenting the constructed shared experience information to a user.

In this embodiment, a case in which the shared experience information of the first user A is presented in accordance with a request of the first user A will be explained. As for the same function as in the first embodiment, the explanation will be omitted by allotting the same symbol.

[Configuration of the Server Device 3]

Figure 7:
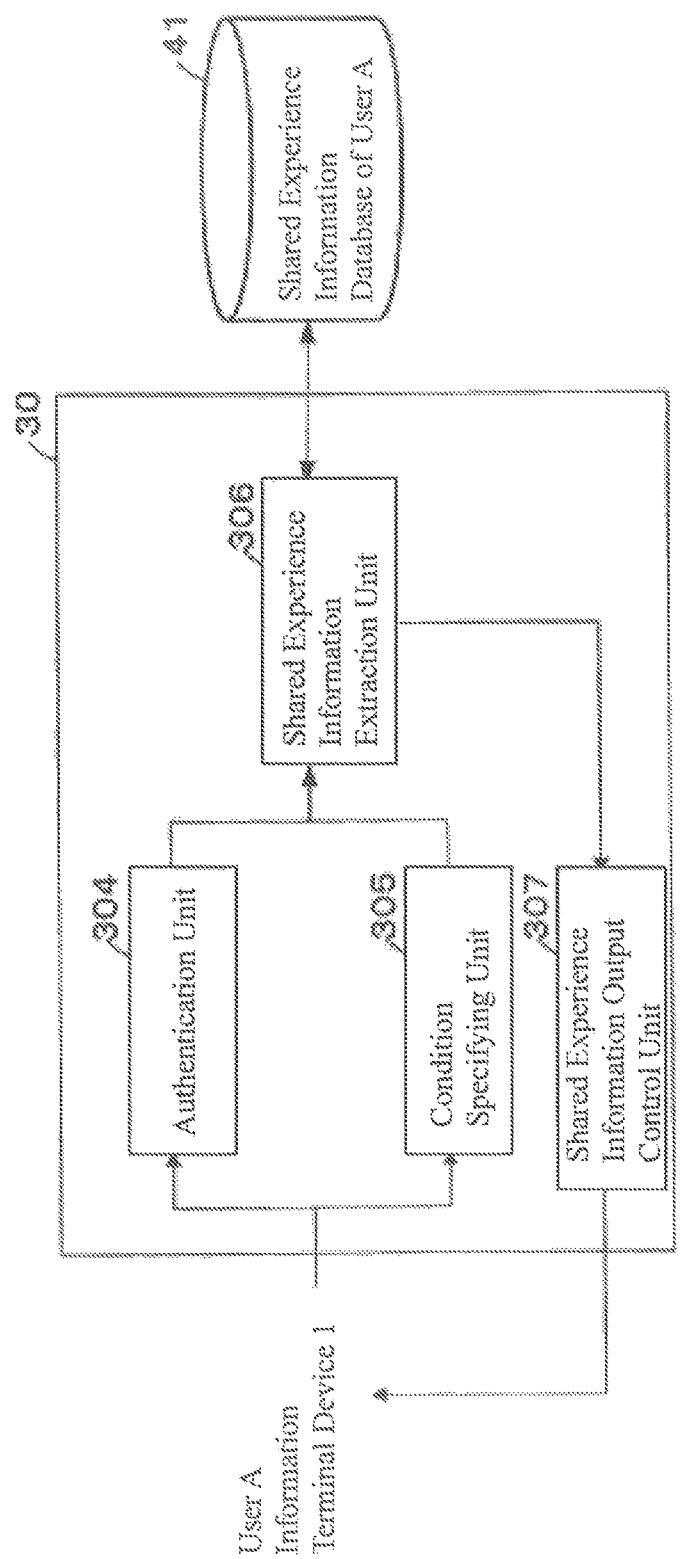
FIG. 7 is a view showing a functional configuration of a shared experience information construction presentation of a server device.
Figure 8:
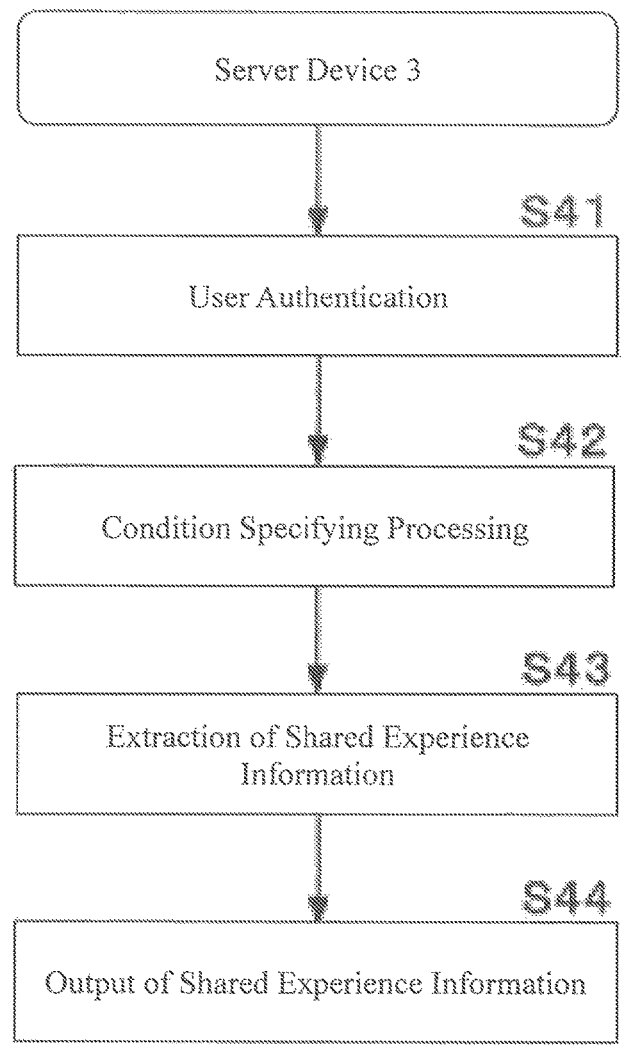
FIG. 8 is a flowchart showing an operation of presenting shared experience information of this system.

As shown in FIG. 7, the processing server 30 is provided with the authentication unit 304 for authenticating a user. This authentication unit 304 performs an authentication of the first user A on the information relating to the first user A transmitted from the information terminal device 1 of the first user A via a network.

As shown in FIG. 7, the processing server 30 is provided with a condition specifying unit 305 for specifying the condition by a user. This condition specifying unit 305 performs processing on condition specifications between this condition specifying unit and the information terminal device 1 of the first user A when the authentication of the first user A has been successfully performed by the authentication unit 304. As for this condition specification, for example, the condition specifying unit 305 specifies the shared experience information between the first user A and a prescribed user, or specifies the shared experience information on a prescribed date and time or the location.

As shown in FIG. 7, the processing server 30 is provided with a shared experience information extraction unit 306 that extracts shared experience information. This shared experience information extraction unit 306 extracts the shared experience information stored in the shared experience information database 41 of the first user A. Especially, in this embodiment, the shared experience information extraction unit 306 extracts, when a condition on the shared experience information has been specified by the information terminal device 1 of the first user A, the shared experience information that matches the condition from the shared experience information stored in the shared experience information database 41. The shared experience information extraction unit 306 may be configured such that the shared experience information extraction unit extracts the shared experience information stored in the shared experience information database 41 in a state in which the shared experience information is processed into a prescribed format.

The processing server 30 is, as shown in FIG. 7, provided with a shared experience information output control unit 307 that outputs the shared experience information extracted by the shared experience information extraction unit 306 to an information terminal of the first user A via a network.

This shared experience information output control unit 307 may be configured to display, for example, the shared experience information on an information terminal device of a user in the order of the acquisition date and time of the content (Example 2), or display the shared experience information between the user and a prescribed user on the information terminal device of the user (Example 3). Further, the shared experience information output control unit 307 may be configured to display the shared experience information shown on a prescribed map on the information terminal device of the user based on the acquisition location and/or the shared location of the content included in the shared experience information (Example 4). Further, the shared experience information output control unit 307 may be configured to output the shared number of times of the content at a prescribed location to the information terminal device of the user based on the acquisition date and time, the acquisition location, the shared date and time and/or the shared location, or output the shared number of times of the content during a prescribed time period to the information terminal device of the user. Further, the shared experience information output control unit 307 may be configured to output the shared experience information to the information terminal device of the user in a state in which the information on the user is excluded (Example 5).

[Operation of Shared Experience Information Presentation of This System 1]

Next, the operation of this system 1 will be explained with reference to the flowchart shown in FIG. 8. In the following explanation, "Step" will be abbreviated as "S".

Initially, in the server device 3, the authentication unit 304 performs an authentication of the first user A on the information relating to the first user A transmitted from the information terminal of the first user A via a network (S41).

This condition specifying unit 305 performs processing on condition specifications between this condition specifying unit and the information terminal of the first user A when the authentication of the first user A has been successfully performed by the authentication unit 304 (S42).

Then, the shared experience information extraction unit 306 extracts, when a condition on the shared experience information has been specified by the information terminal device of a user, the shared experience information that matches the condition from the shared experience information stored in the shared experience information database 41 (S43).

The shared experience information output control unit 307 outputs the shared experience information extracted by the shared experience information extraction unit 306 to the information terminal of the first user A via a network (S44).

EXAMPLE 1

Figure 9:
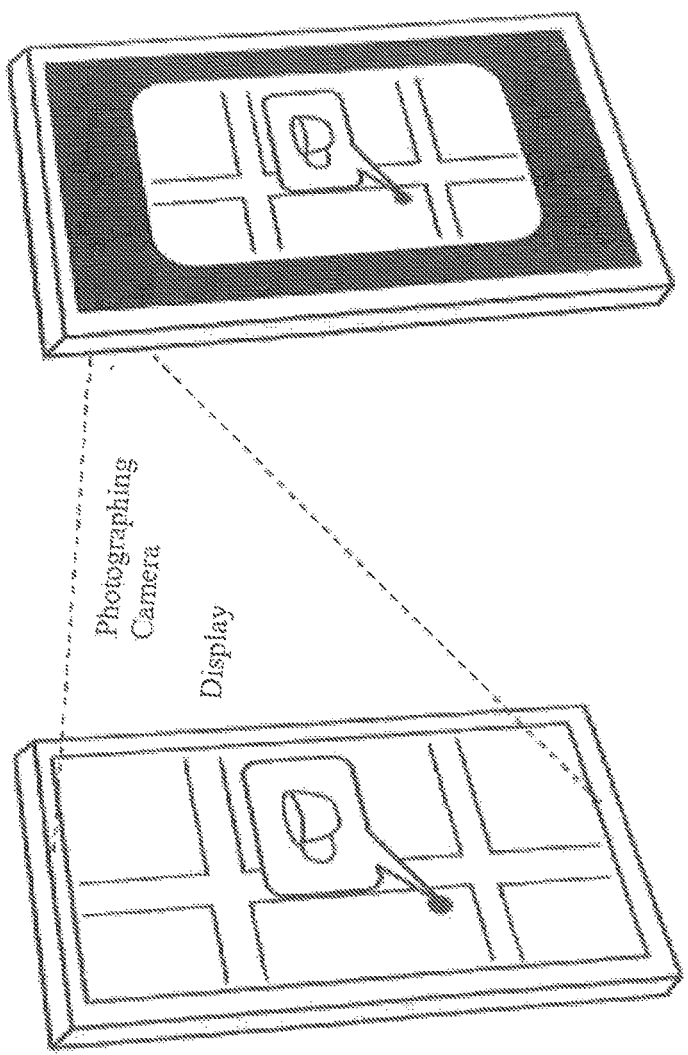
FIG. 9 is a view showing information terminal devices of first and second users according to Example 1.

In this example, as shown in FIG. 9, as a content on a prescribed experience of the first user A, a site image relating to a map and a store displayed on a display of the information terminal device 1 of the first user A is used.

Specifically explaining, in the information terminal device 1 of the first user A, the content identification information output unit 13 outputs the site image itself as content identification information by displaying the site image on a display. In the information terminal device 2 of the second user B, the content identification information input part 22 inputs the site image displayed on the display of the information terminal device 1 of the first user A by directly photographing the site image with the built-in photographing camera.

Further, in the information terminal device 1 of the first user A, the first unique key generation unit 14 defines the entire or a part of image information of the site image displayed on the display as a unique key, or defines a prescribed image pattern corresponding to the site image as a unique key. Further, in the information terminal device 2 of the second user B, the second unique key generation unit 23 defines the entire or a part of image information of the site image of the site photographed by a photographing camera as a unique key, or defines a prescribed image pattern corresponding to the site image as a unique key. These unique keys are collated by being compared with each other in the unique key collation unit 302 of the server device 3, and when the collation has been successfully performed, the shared experience information between the first user A and the second user B is constructed.

For this reason, between the information terminal device 1 of the first user A and the information terminal device 2 of the second user B, an intuitive operation that the site image displayed on the display of the information terminal device 1 of the first user A is photographed with a photographing camera of the information terminal device 2 of the second user B enables to construct the shared experience information between the first user A and the second user B.

In this example, between the information terminal device 1 of the first user A and the information terminal device 2 of the second user B, although a visual content, such as, e.g., a site image and a photographed image, is exemplified as a content, a content may be an auditory content by sounds (including music). That is, the content identification information output unit 13 of the information terminal device 1 of the first user A is an attached speaker, and content identification information is output by a sound of the speaker. Further, the content information input part 22 of the information terminal device 2 of the second user B is an attached microphone, and inputs the content identification information output by the voice of the speaker of the information terminal device 1 of the first user A by recording the content identification information.

In cases where the content is a visual one, such as an image, in general, the input and output of the content identification information between the information terminal device 1 of the first user A and the information terminal device 2 of the second user B are performed by visual one such as an image, but an auditory one, such as a prescribed sound pattern, may be used. On the other hand, in cases where the content is an auditory one, such as a sound, in general, the input and output of the content identification information between the information terminal device 1 of the first user A and the information terminal device 2 of the second user B are performed by an auditory one, such as a sound, but a visual one, such as a prescribed image pattern, may be used. In short, despite that the content is a visual one or an auditory one, as the input and output of the content identification information between the information terminal device 1 of the first user A and the information terminal device 2 of the second user B, a visual or auditory content identification information is arbitrarily used, and the collation in the server device 3 is performed by each unique key generated from the arbitrarily used visual or auditory content identification information.

EXAMPLE 2

Figure 10:
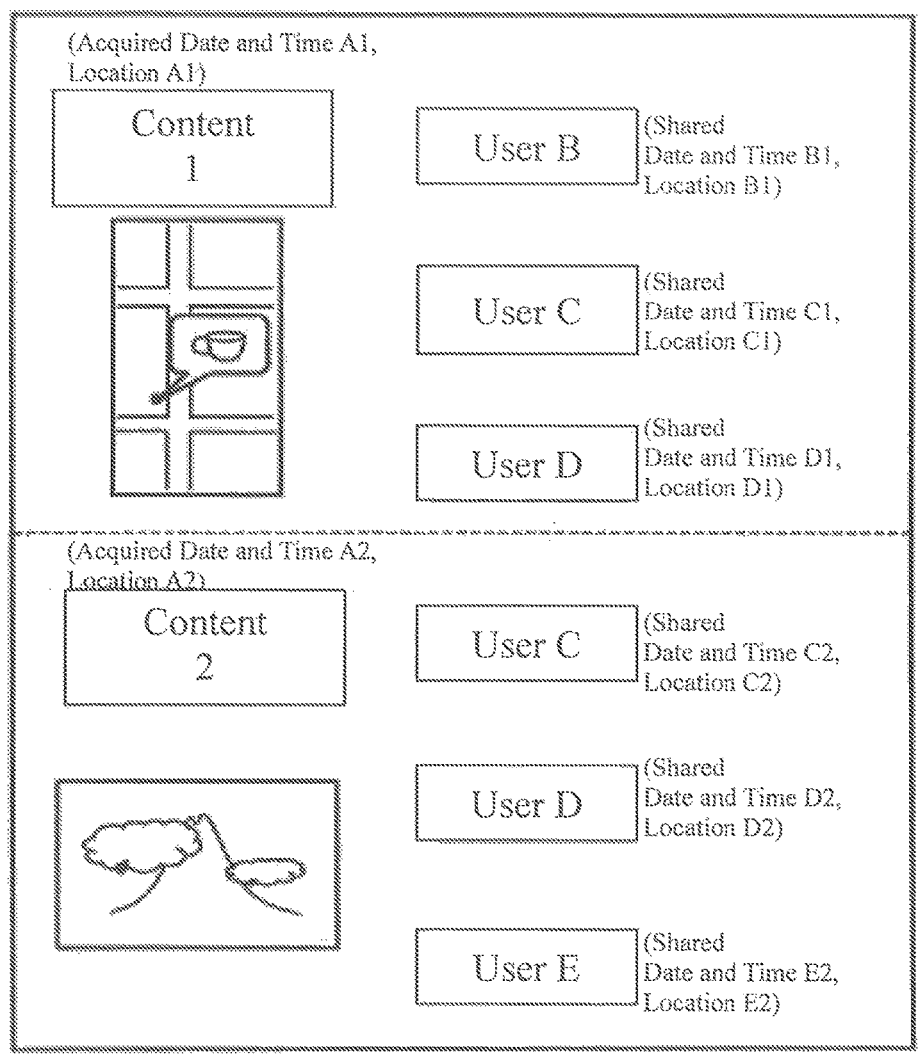
FIG. 10 is a view showing a display screen of shared experience information according to Example 2.

In this Example, as shown in FIG. 10, in the display of the information terminal device 1 of the first user A, the shared experience information is displayed in the order of the acquisition date and time of the content.

Specifically explaining, the shared experience information output control unit 307 of the server device 3 makes the information terminal device 1 display the shared experience information in the order of the acquisition date and time of the content in accordance with the instruction from the information terminal device 1 of the first user A. For example, in the display of the information terminal device 1 of the first user A, contents 1 and 2, etc., are displayed together with the site image or the photographed image in the order of the acquisition date and time A1 and A2 of the respective contents. In the display area of the content 1, the names B, C, and D of the shared users, the shared dates and times B1, C1, and D1, and the shared locations B1, C1, and D1 are displayed. Further, in the display area of the content 2, the names C, D, and E of the shared users, the shared dates and times C2, D2, and E2, and the shared locations C2, D2, and E2 are displayed.

Thus, the first user A can browse the shared experience information on each past content in chronological order.

EXAMPLE 3

Figure 11:
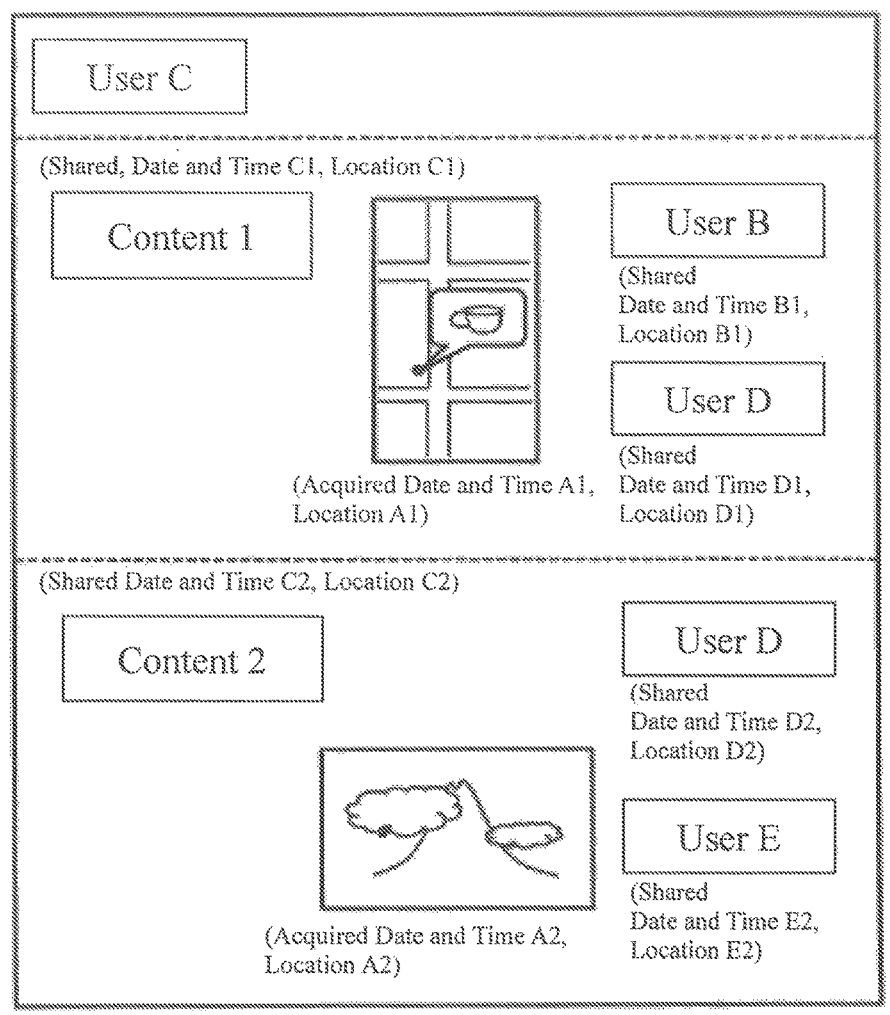
FIG. 11 is a view showing a display screen of shared experience information according to Example 3.

In this Example, as shown in FIG. 11, in the display of the information terminal device 1 of the first user A, the shared experience information between the first user A and a specific user is displayed.

Specifically explaining, the shared experience information output control unit 307 of the server device 3 makes the information terminal device 1 of the first user A display the shared experience information between the first user A and specific users in accordance with the instruction from the information terminal device 1 of the first user A. For example, in the display of the information terminal device 1 of the first user A, the shared experience information between the first user A and a specific user C is displayed collectively. At this time, the contents 1 and 2 shared with the user C are displayed together with the side image or the photographed image in the order of the shared dates and times C1 and C2. In the display area of the content 1, in addition to the specific user C, names B and D of other shared users B and D, the shared dates and times B1 and D1, and the shared locations B1 and D1 are displayed. Further, in the display area of the content 2, in addition to the specific user C, names D and E of other shared users D and E, the shared dates and times D2 and E2, and the shared locations D2 and E2 are displayed.

Thus, the first user A can browse the shared experience information shared with the user C by specifying the specific user C in chronological order.

EXAMPLE 4

Figure 12:
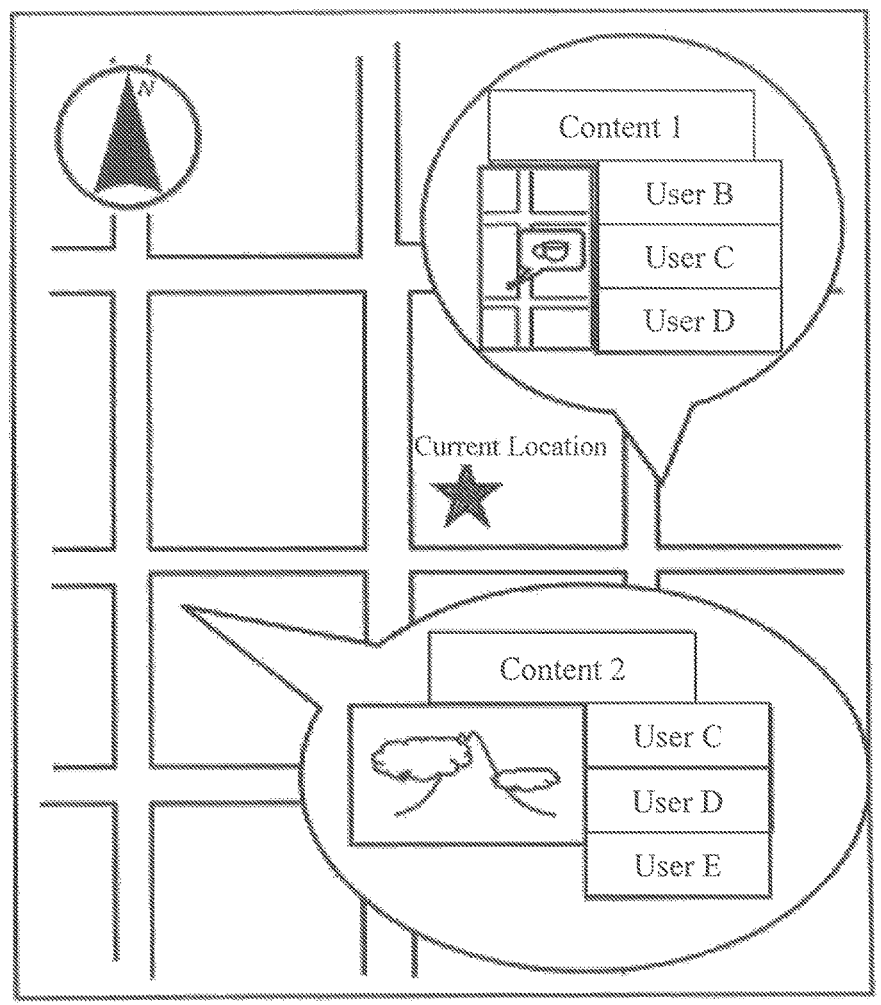
FIG. 12 is a view showing a display screen of shared experience information according to Example 4.

In this Example, as shown in FIG. 12, in the display of the information terminal device 1 of the first user A, the shared experience information shown on a prescribed map is displayed.

Specifically explaining, the shared experience information output control unit 307 makes the information terminal device of a user display the shared experience information shown on a prescribed map display based on the acquisition location and/or the shared location of the content included in the shared experience information. For example, in the display of the information terminal device 1 of the first user A, shared experience information relating to the contents 1 and 2 shown on a prescribed map are displayed. At this time, in the display area of the content 1, the site image of the content 1 and the shared user names B, C, and D are displayed in a balloon at the northeast corner of the first crossroad on the east side of the "current location". Further, in the display area of the content 2, the photographed image of the content 2 and the shared user names C, D, and E are displayed in a balloon at the southeast corner of the first crossroad on the west side of the "current location".

For this reason, the first user A can intuitively browse shared experience information that were constructed in the past near the current location, locations where many shared experience information were constructed.

EXAMPLE 5

Figure 13:
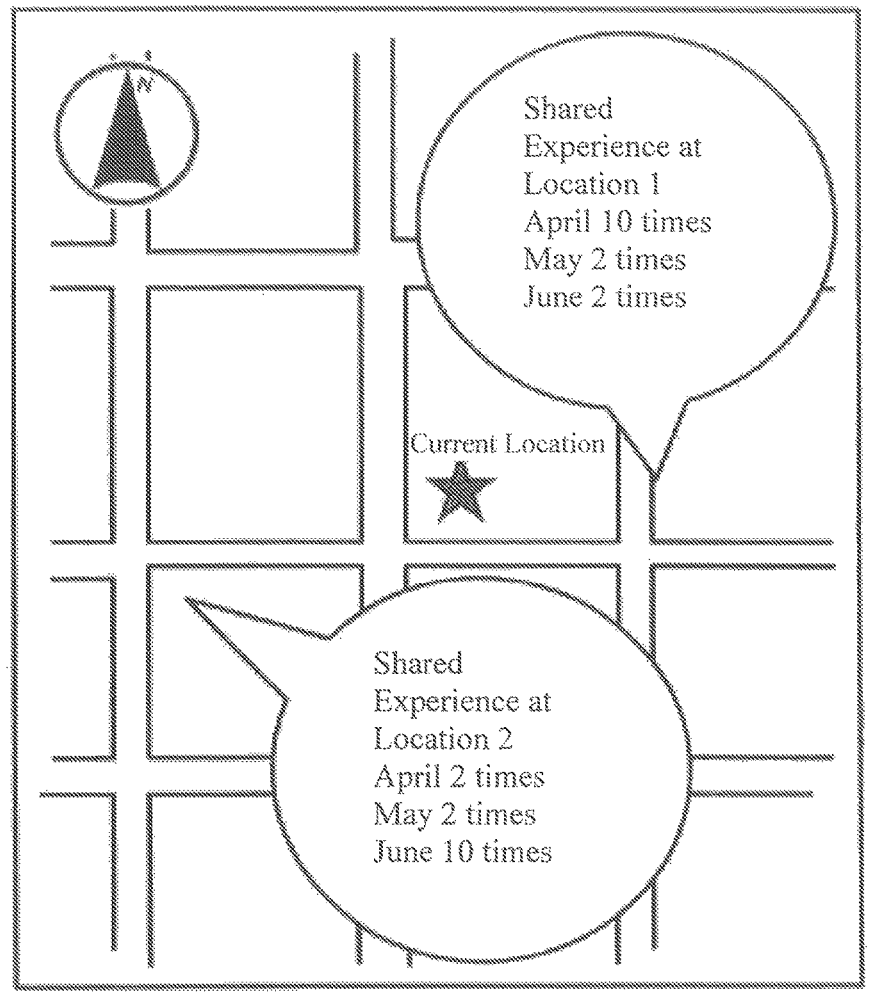
FIG. 13 is a view showing a display screen of shared experience information according to Example 5.

In this Example, as shown in FIG. 13, in the display of the information terminal device 1 of the first user A, the shared number of times of the contents at specific locations is displayed in a state in which user names are excluded.

Specifically explaining, the shared experience information output control unit 307 makes the information terminal device 1 of the first user A display the shared experience information in a state in which the information relating to users is excluded. Further, the shared experience information output control unit 307 makes the information terminal device of a user output the shared number of times of the content at prescribed locations based on the acquisition date and time, the shared date and time and/or the shared location of the content included in the shared experience information. For example, in the display of the information terminal device 1 of the first user A, the shared experience information relating to the locations 1 and 2 shown on a prescribed map are displayed. At this time, in the display area of the location 1, the months when experience was shared (April, May, and June) and the shared number of times (10 times, 2 times, 2 times) are displayed at the northeast corner of the first crossroad on the east side of the "current location". Further, in the display area of the location 2, the month when experience was shared (April, May, and June) and the shared number of times (2 times, 2 times, 10 times) are displayed at the southeast corner of the first crossroad on the west side of the "current location".

Thus, shared experience information maintaining anonymity can be used. For example, when it is currently June, comparing the location 1 and the location 2, at the location 2, there were more shared experience information constructed in June. This reveals that there are more attractive locations where a user wants to construct a shared experience in June. Therefore, the user can be guided to more attractive places at that time.

EXAMPLE 6

Figure 14:
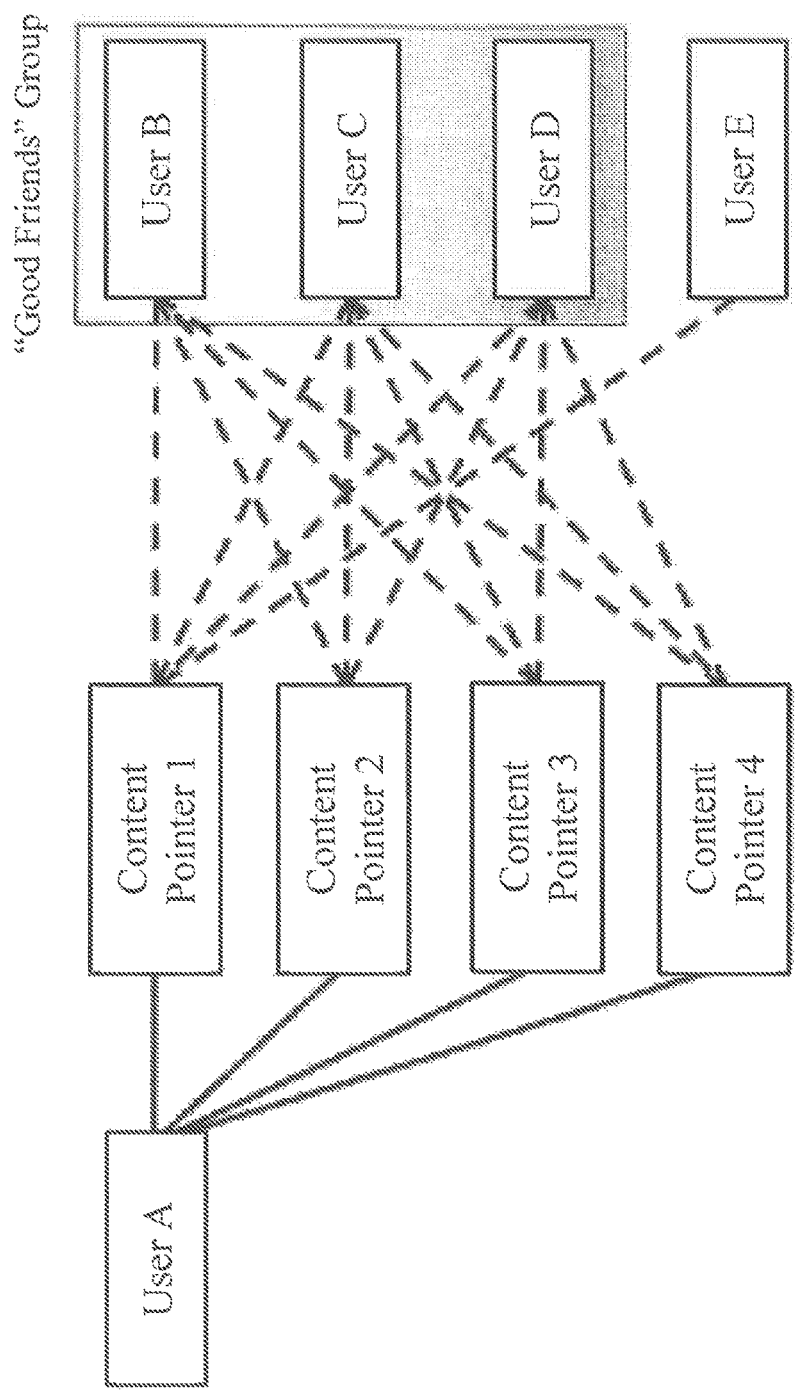
FIG. 14 is a view showing a grouping configuration of shared experience information according to Example 6.

In this Example, as shown in FIG. 14, users having a commonality for the acquisition date and time, the acquisition location, the shared date and time, or the shared location of the content are grouped automatically.

Specifically, the shared experience information extraction unit 306 groups users who constructed a number of shared experience information having a commonality and stored in the shared experience information database of prescribed users based on the acquisition date and time, the acquisition location, the shared date and time and/or the shared location. For example, in the shared experience information stored in the shared experience information database of the user A, in cases where many shared experience information are constructed between the user A and other user B, user C, and user D, the shared experience information extraction unit 306 automatically groups the user B, the user C, and the user B (for example, the group may be named as "good friend group") on the shared experience information database of the user A, and extracts the shared experience information by specifying a specific group ("good friend group") by the user A.

Thus, users are grouped into prescribed groups and other groups. As a result, the user can present by easily selecting groups, the shared experience information shared with a plurality of users or introduce the shared experience information collectively to a plurality of users.

Although embodiments of the present invention have been explained with reference to the drawings, the present invention is not limited to the illustrated embodiments. It should be noted that various changes and/or modifications can be added to the illustrated embodiments within the same range or the equivalent range of the present invention.

Description of the Symbols

1 . . . information terminal device of the user A
11 . . . first input part
12 . . . content selection unit
13 . . . content identification information output unit
14 . . . first unique key generation unit
15 . . . first user information transmission unit
16 . . . content cache
2 . . . information terminal device of the second user
21 . . . second input unit
22 . . . content identification information input unit
23 . . . second unique key generation unit
24 . . . second user information transmission unit
3 . . . server device
30 . . . processing server
301 . . . user information reception unit
302 . . . unique key collation unit
303 . . . shared experience information construction unit
304 . . . authentication unit
305 . . . condition specifying unit
306 . . . shared experience information extraction unit
307 . . . shared experience information output control unit
41 . . . shared experience information database of the user A
42 . . . shared experience information database of the user B
50 . . . cache server

The invention claimed is:

1. A shared experience information construction system comprising:
an information terminal device of a first user;
an information terminal device of a second user; and
a server device connected to the information terminal devices of the first user and the second user via a network,
wherein the information terminal device of the first user includes
a content selection unit that selects a content on a prescribed experience by the first user,
a content identification information output unit that outputs information that identifies the content selected by the content selection unit to the information terminal device of the second user,
a first unique key generation unit that generates a unique key corresponding to the content selected by the content selection unit, and
a first user information transmission unit that transmits information on the first user, a unique key generated by the first unique key generation unit, and information on the content to the server device via the network,
wherein the information terminal device of the second user includes a content identification information input unit that inputs the information that identifies the content output from the information terminal device of the first user, a second unique key generation unit that generates a unique key corresponding to the information that identifies the content input by the content identification information input unit, and a second user information transmission unit that transmits information on the second user, the unique key generated by the second unique key generation unit, and information on an input date and time and/or an input location of the information that identifies the content input by the content identification information input unit to the server device via the network, wherein the server device includes a unique key collation unit that collates the unique keys transmitted from the information terminal device of the first user and the information terminal device of the second user, a shared experience information construction unit that defines the input date and the time and/or the input location of information that identifies the content transmitted from the second information terminal device as a shared date and time and/or a shared location of the content when a collation of the unique keys has been successfully performed by the unique key collation unit and correlates the information on the first user, the information of the second user, the information on the content, and the information on the shared date and time and/or the shared location with each other to construct shared experience information between the first user and the second user, and a shared experience information storage unit that stores the shared experience information between the first user and the second user constructed by the shared experience information construction unit.

2. The shared experience information construction system as recited in claim 1, wherein the first user information transmission unit of the first information terminal device transmits the information on an acquisition date and time and/or an acquisition location of the content to the server device, and wherein the shared experience information construction unit of the server device correlates the information on the acquisition date and time and/or the acquisition location of the content and the information on the shared date and time and/or the shared location of the content with each other.

3. The shared experience information construction system as recited in claim 1, wherein the content identification information output unit of the information terminal device of the first user is an attached display and the information terminal device of the first user outputs the information that identifies the content by displaying it on the display, and wherein the content information input unit of the information terminal device of the second user is an attached photographing camera, and the information terminal of the second user inputs the information that identifies the content displayed on the display of the information terminal device of the first user by photographing the information.

4. The shared experience information construction system as recited in claim 1, wherein the content identification information output unit of the information terminal device of the first user is an attached speaker and the information terminal device of the first user outputs the information that identifies the content by a sound of the speaker, and wherein the content information input unit of the information terminal device of the second user is an attached microphone, and the information terminal of the second user inputs the information that identifies the content output by the sound of the speaker of the information terminal device of the first user by recording the information.

5. The shared experience information construction system as recited in claim 1, wherein the information terminal device of the first user transmits the output date and time and/or the output location that output the information that identifies the content between the information transmission unit of the first user and the information terminal device of the second user, and wherein the unique key collation unit of the server device performs a collation whether the output date and time and/or the output location transmitted from the information terminal device of the first user and the input date and time and/or the input location transmitted from the information terminal device of the second user are within a range of a prescribed time and/or region.

6. The shared experience information construction system as recited in claim 1, wherein the server device is equipped with a shared experience information extraction unit that extracts the shared experience information stored in the shared experience information storage unit and a shared experience information output control unit that outputs the shared experience information extracted by the shared experience information extraction unit to the information terminal device of the user.

7. The shared experience information construction system as recited in claim 6, wherein the shared experience information extraction unit extracts, when a condition on the shared experience information is specified by the information terminal device of the user, the shared experience information that matches the condition from the shared experience information stored in the shared experience information storage unit.

8. The shared experience information construction system as recited in claim 6, wherein the shared experience information extraction unit extracts the shared experience information stored in the shared experience information storage unit in a state in which the information has been processed into a prescribed format.

9. The shared experience information construction system as recited in claim 6, wherein the shared experience information output control unit makes the information terminal device of the user display the shared experience information in the order of the acquisition date and time of the content.

10. The shared experience information construction system as recited in claim 6, wherein the shared experience information output control unit makes the information terminal device of the user display the shared experience information between the user and a prescribed user.

11. The shared experience information construction system as recited in claim 6, wherein the shared experience information output control unit makes the information terminal device of the user display the shared experience information shown on a prescribed map based on the acquisition location and/or the shared location of the content included in the shared experience information.

12. The shared experience information construction system as recited in claim 6, wherein the shared experience information output control unit makes the information terminal device of the user output a shared number of times of the content at a prescribed location based on the shared date and time and/or the shared location of the content included in the shared experience information.

13. The shared experience information construction system as recited in claim 6, wherein the shared experience information output control unit makes the information terminal device of the user output a shared number of times of the content during a prescribed period of time based on the shared date and time and/or the shared location of the content included in the shared experience information.

14. The shared experience information construction system as recited in claim 6 wherein the shared experience information output control unit makes the information terminal device of the user output the shared experience information in a state in which the information relating to users is excluded.

15. The shared experience information construction system as recited in claim 6, wherein the shared experience information extraction unit groups shared experience information having a commonality based on the acquisition date and time, the acquisition location, the shared date and time and/or the shared location of the content included in the shared experience information.

* * * * *